United States Patent [19]

Girodat et al.

[11] Patent Number: 4,893,241

[45] Date of Patent: Jan. 9, 1990

[54] CROP PROCESSING APPARATUS

[75] Inventors: Joseph C. Girodat, West Milton; David W. Rumble, King City; Lawrence M. Sweetman, Mississauga; William Swindall, Ayr, all of Ontario, Canada

[73] Assignee: Massey-Ferguson Services N.V., Curacao, Netherlands Antilles

[21] Appl. No.: 36,952

[22] Filed: Apr. 10, 1987

[51] Int. Cl.[4] .................... A01D 41/00; G06F 15/20
[52] U.S. Cl. .................................. 364/424.07; 56/10.2
[58] Field of Search ................. 364/424, 551, 424.01, 364/424.05, 424.07; 56/10.2, DIG. 15

[56] References Cited

U.S. PATENT DOCUMENTS

| | | | |
|---|---|---|---|
| 3,514,929 | 6/1970 | Cornish | 56/10.2 |
| 4,130,980 | 12/1978 | Fardal et al. | 56/10.2 |
| 4,276,298 | 3/1983 | Sokol et al. | 364/551 |
| 4,296,409 | 10/1981 | Whitaker et al. | 56/10.2 |
| 4,487,002 | 12/1984 | Kruse et al. | 56/10.2 |
| 4,513,562 | 4/1985 | Strubbe | 56/10.2 |
| 4,527,241 | 7/1985 | Sheehan et al. | 364/424 |
| 4,548,027 | 10/1985 | Maeoka | 56/10.2 |

Primary Examiner—Parshotam S. Lall
Assistant Examiner—Thomas G. Black

[57] ABSTRACT

Crop processing apparatus comprising crop processing means (18, 23, 24) driven by drive means (29) and an automatic control system comprising sensor means (50, 51) for sensing transmission loss in the drive means (29) and producing a corresponding transmission loss signal which is proportional to the load exerted by crop on the crop processing means, setting means (Sr) for selecting a desired level of crop load and producing a reference crop load signal (Sr) corresponding to a selected level of transmission loss, signal processing means (13) which compares the transmission loss signal with the reference crop load signal to produce a control signal (Se), and actuator means (14) that is controlled in accordance with said control signal and is effective to vary the rate of feed crop to the processing means to maintain a substantially uniform load of crop in the crop processing means. The transmission loss takes the form of relative rotation or slip between input drive and output driven shafts (31, 33). Preferably, the drive means comprises a belt driven (34), and belt slip is used as a measure of transmission loss. The belt slip in the belt drive to a crop threshing cylinder is preferably used as the control parameter. The sensor means (50, 51) measures the rates of rotation (Sb, Sc) of the input drive shaft (31) and output driven shaft (33, 36) and the signal processing means (13) calculates the ratio of said rates of rotation to determine belt slip. This belt slip value may be normalized using values of the rate of rotation (Sbn, Scn) of two shafts measured under standard, no-load conditions. The actuator (14) may be the forward speed controller of a combine harvester.

27 Claims, 10 Drawing Sheets

CROP PROCESSING APPARATUS

TECHNICAL FIELD

This invention relates to crop processing apparatus having an automatic control system to vary the rate of feed of crop to crop processing means of the apparatus so as to maintain a substantially constant crop loading of the crop processing means. In particular, the invention relates to a combine harvester having an automatic control system for controlling the rate of feed of crop through the combine by controlling the speed at which the combine moves through a field of crop.

The crop processing means of a combine harvester comprising threshing, separating and cleaning mechanisms can be adjusted to perform at maximum efficiency if the feed rate of crop material through the combine is constant. Stationary threshing machines had feed assemblies which could accurately control the rate at which crop material was fed to the threshing assembly. Early self propelled combine harvesters on the other hand had traction drive transmissions with several fixed ratio, gear sets which could be selected. It was soon recognized that a combine harvester with a few selectable fixed ground speeds is unsatisfactory. It could not adequately control crop material feed rate.

Infinitely variable traction drives were introduced to make it possible to more accurately control crop material feed rate. These drives are generally a variable speed belt drive or a hydrostatic drive in combination with a gear transmission. These drives have appeared to be reasonably satisfactory. In practice the operator of a combine harvester becomes fatigued after a period of time and fails to adjust the infinitely variable traction drive to maintain a constant crop material feed rate. With instruments now available to accurately measure crop material feed rate, it is clear that a skilled operator cannot maintain the feed rate as constant as desired because he cannot sense variations in feed rate or cannot react to sensed feed rate variations quickly enough to obtain maximum efficiency.

The need to achieve high efficiency has increased as combine harvesters have become larger and more expensive and as the resources required to produce a given quantity of grain have increased while the return from sale of the grain has decreased.

The need for an automatic control system to control the rate at which crop material is fed into a combine harvester has been apparent for a number of years, but the systems that have been developed have all had serious deficiencies, and very few have been commercially successful. The deficiencies include high cost, the use of unsatisfactory control parameters, inaccurate sensors, sensors with poor durability, inadequate processing of the information received from the sensors, and inadequate ground speed and drive control.

U.S. Pat. No. 3,514,929 discloses an automatic control system for a combine harvester which controls the ground speed of the combine so as to maintain constant the torque in the drive shaft to the crop collecting header of the combine. A torque sensor is provided in said drive shaft comprising adjacent coaxial drive and driven elements connected to respective input and output portion of the drive shaft, and a series of springs located between the drive and driven elements so as to transmit drive therebetween. The drive and driven elements rotate relative to one another to load the springs as torque is applied to the drive shaft. A pair of magnetic pickups produce pulse signals in a manner dependent upon rotation of the drive and driven elements, and these pulse signals are compared to produce an output signal that is dependent upon the phase difference between the two signals. Thus, the greater the torque in the drive shaft, the greater the relative rotation between the drive and driven elements, and thus the greater the phase difference. The output signal is therefore proportional to the torque.

DISCLOSURE OF THE INVENTION

It is an object of the invention to provide an improved automatic ground speed control system for a combine harvester which will maintain a selected feed rate for crop material entering the combine harvester and which is easily over-ridden manually by the operator.

Crop processing apparatus according to the invention comprises crop processing means; drive means comprising an input drive shaft, an output driven shaft drivingly connected to the crop processing means, and transmission means through which power is transmitted from the input drive shaft to the output driven shaft; and an automatic control system comprising sensor means for sensing the load exerted by crop on the crop processing means and producing a corresponding crop load signal, setting means for selecting a desired level of crop load and producing a reference crop load signal, signal processing means which compares the crop load signal with the reference crop load signal to produce a control signal, and actuator means that is controlled in accordance with said control signal and is effective to vary the rate of feed of crop to the processing means to maintain a substantially uniform load of crop in the crop processing means; characterised in that the transmission means is such as to allow relative rotation between the input drive shaft and output driven shaft under constant load conditions, thereby producing a transmission loss; the sensor means comprises a first sensor for producing an output signal corresponding to the rate of rotation of the output driven shaft; the signal processing means processes the output signal from the first sensor to produce a transmission loss signal corresponding to said transmission loss in the transmission means; and the setting means produces a reference crop load signal corresponding to a selected level of transmission loss of the transmission means.

The invention therefore uses the load on the crop processing means as the feed rate control parameter, and uses the transmission loss in the drive to the crop processing means as a measure of the crop load, the transmission loss taking the form of relative rotation or slip between the input drive and output driven shafts. Preferably, the drive means includes a belt drive as the transmission means, and belt slip is the transmission loss that is used as a measure of crop load. Preferably, a belt drive to a crop threshing cylinder is used as the control parameter because this is the most responsive to crop load.

Preferably, the sensor means measures the rates of rotation of the input drive shaft and output driven shaft, and the signal processing means calculates the ratio of said rates of rotation to determine belt slip. This belt slip value may be normalised using values of the rate of rotation of the two shafts measured under standard, no-load conditions so that the normalised belt slip value can be compared with any reference crop load signal preselected by the operator using the setting means. Alternatively, the belt slip value may be calculated with the crop processing means processing crop at the required feed rate and recorded as the reference crop load signal at which the belt slip is to be maintained.

It will be readily appreciated that the actuator means controlled in accordance with the control signal may comprise the forward speed controller of a combine harvester so that the forward speed of the combine is varied automatically to maintain a substantially uniform load of crop in the crop processing means.

The forward speed controller may also serve as the actuator for manual control of the forward speed of the combine harvester. For example, if a combine harvester has manual forward speed control means comprising a mechanical connection between a manually-operable control in the cab of the combine and a forward speed controller, a variable-length link may be provided in series with said connection and controlled in accordance with the control signal for automatic control of the forward speed of the combine. The variable-length link may be a hydraulic ram with an associated control valve operated in accordance with said control signal.

Alternatively, the forward speed controller may comprise a hydraulic actuator under the independent control of two valves, one being operated in the manual control mode in accordance with the manually-operable control in the cab of the combine, and the other being operated in the automatic control mode in accordance with said control signal.

In yet another embodiment of the invention, the forward speed controller may be controlled in accordance with electrical sensor signals for both the automatic and manual control modes. Thus, the manually-operable control in the cab of the combine may produce a corresponding electrical signal that is fed to the signal processing unit of the automatic control system and which is processed therein to generate a control signal for the manual control mode.

BRIEF DESCRIPTION OF THE DRAWINGS.

The invention will now be described by way of example with reference to the accompanying drawings in which.

BEST MODE OF CARRYING OUT THE INVENTION

Figure 1:
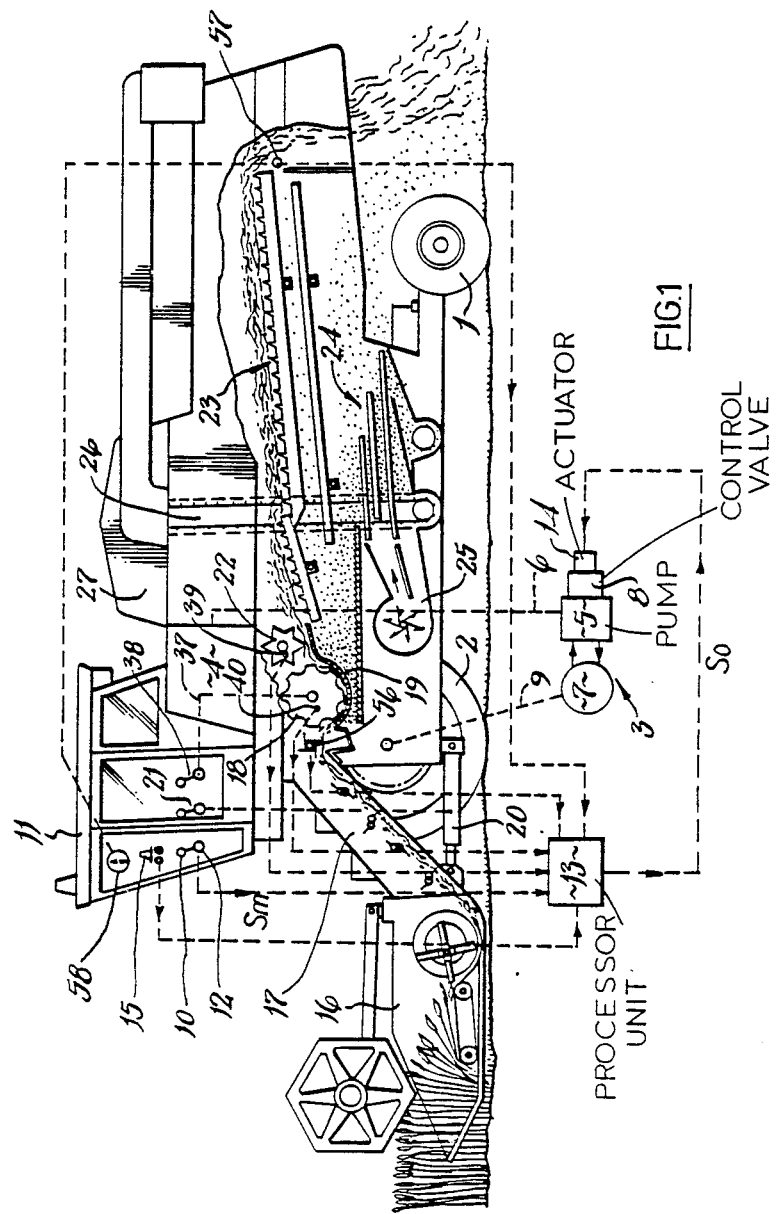
FIG. 1 shows a schematic diagram of a self-propelled combine harvester fitted with an automatic control system according to the invention for automatic control of the forward speed of the combine.

The illustrated combine comprises rear steerable wheels 1 and front drive wheels 2 which are driven through a hydrostatic drive system 3 from an engine 4. The hydrostatic drive system comprises a variable displacement hydrostatic pump 5 that is driven through a belt drive 6 by the engine 4, a fixed displacement hydraulic motor 7 that is connected in a closed loop hydrostatic circuit with the pump 5, and a displacement control valve 8 that is associated with the pump, and controls the flow of fluid to the motor 7 so as to vary the speed and direction of rotation of the motor 7. A mechanical transmission 9 transfers the output drive from the motor 7 to the front drive wheels 2. A manual speed control lever 10 located in the cab 11 of the combine is coupled to an electrical transducer 12 so as to produce a proportional control signal Sm that is applied under the control of a processor unit 13 to an electromagnetic actuator 14 that controls the setting of the pump control valve 8. A mode selection switch 15 is also provided in the cab 11, and can be set to select either the manual or an automatic mode of forward speed control, and produces an input to the processor unit 13 that sets the latter for the selected mode of control. The combine operator can therefore set switch 15 to select the manual mode of control, and then operates lever 10 to control the forward speed of the combine.

The combine further includes crop cutting and conveying means at the front of the combine comprising a grain table 16 connected to the lower end of a crop elevator 17 that feeds the cut crop upwards and rearwards to a crop threshing mechanism 18,19. The elevator 17 is pivotally connected to the combine at its upper end and is raised and lowered by hydraulic rams 20 to control the height of the table above the ground, the rams 20 being connected in a hydraulic control circuit with a manually operated control valve 21 in the cab 11.

The crop threshing mechanism is of conventional construction and comprises a threshing cylinder 18 and a concave 19 that co-operate to thresh crop passing therebetween as the cylinder is rotated. A rotary beater 22 is located behind the cylinder above the crop flow path and serves to feed threshed crop on to grain separation means 23 comprising a set of straw walkers of conventional construction that discharge the crop straw from the rear of the combine. Grain separated from the crop in the crop threshing mechanism 18 and straw walkers 23 is collected and fed to conventional grain cleaning means 24 that includes a fan 25 to separate chaff from the grain before the grain is finally delivered by a feed auger 26 to a grain tank 27.

The engine 4 serves to drive all of the aforesaid crop processing means including the cutting and conveying means 16, 17, the crop threshing mechanism 18,19, the beater 22, the grain separation means 23 and the grain cleaning means 24. Conventionally, belt drives are used to transfer the drive from the engine to the crop processing means. In particular, with reference to FIG. 2, the beater 22 is driven via a belt drive 28, and a belt drive 29 is provided between the beater 22 and the cylinder 18. The belt drive 29 comprises a variable speed pulley 30 on the beater shaft 31, a variable speed pulley 32 on an output shaft 33, a drive belt 34 passing over both pulleys 30,32, and a two-speed, chain-drive gearbox 35 connecting the output shaft 33 to the cylinder shaft 36.

The two sheaves of the pulley 30 are axially adjustable relative to one another by a control mechanism 37 from the operator's cab 11, thereby to vary the effective belt diameter of the pulley 30 and the speed of the threshing cylinder 18.

The control mechanism 37 comprises a bifurcated lever 40 that straddles shaft 31 behind the pulley and has a thrust pad 41 on each leg 42 that engages a rear face of the rear sheave 39 of the pulley. The upper end of lever 40 is pivoted at a fixed point 43 and the lower end is pivotally connected to an electrical actuator 44 which is operated to swing the lever outwards against the action of a return spring mechanism 45, thereby moving the rear sheave 39 of the pulley outwards to reduce the spacing between the sheaves and increase the speed of the threshing cylinder 18. The electrical actuator 44 is connected in an electrical control circuit with a cylinder speed selector lever 38 in the cab 11.

An automatic torque responsive unit 46 associated with the pulley 32 serves to adjust the axial spacing of the two sheaves of the pulley to accommodate changes in effective belt diameter of pulley 30, thereby to keep the belt 34 tensioned. The unit 46 comprises a spring 47 that urges the two sheaves together and a cam roller 48 and cam track 49 each associated with a respective sheath so that relative rotation between the sheaves causes the roller 48 to roll on the track 49 and move the two sheaves together. Thus, an increase of sufficient magnitude in the torque transmitted will produce a relative rotation between the sheaves and a corresponding tensioning of the belt.

An automatic control system is provided to control the forward speed of the combine when harvesting so as to maintain a substantially constant flow of crop through the crop processing means of the combine despite variations of crop density in the field. The crop load within the combine is monitored by sensing the power transmitted to drive the crop processing means. In particular, power transmitted in a belt employed to drive the crop processing means is found to be substantially proportional to the amount by which the belt sips on its pulleys, and thus the belt slip is measured and used as the speed control parameter.

The belt slip results from a combination of belt creep and stretching and is a known phenomenon in belt drives operating under normal conditions within the designed range of loading the belt. Under overload conditions, more severe belt slip can occur, but this is undesirable and is not of interest as far as the present invention is concerned.

It has been found that the load on the threshing cylinder is an especially accurate measure of crop load and is therefore a good parameter to use to control the ground speed of the combine. Thus, in the illustrated embodiment (see FIGS. 2 and 3) the power transmitted to the threshing cylinder 18 via the belt drive 29 is monitored by sensing the slip of belt 34 on pulleys 30, 32 as it transfers drive from one pulley 30 to the other pulley 32.

Figure 13:
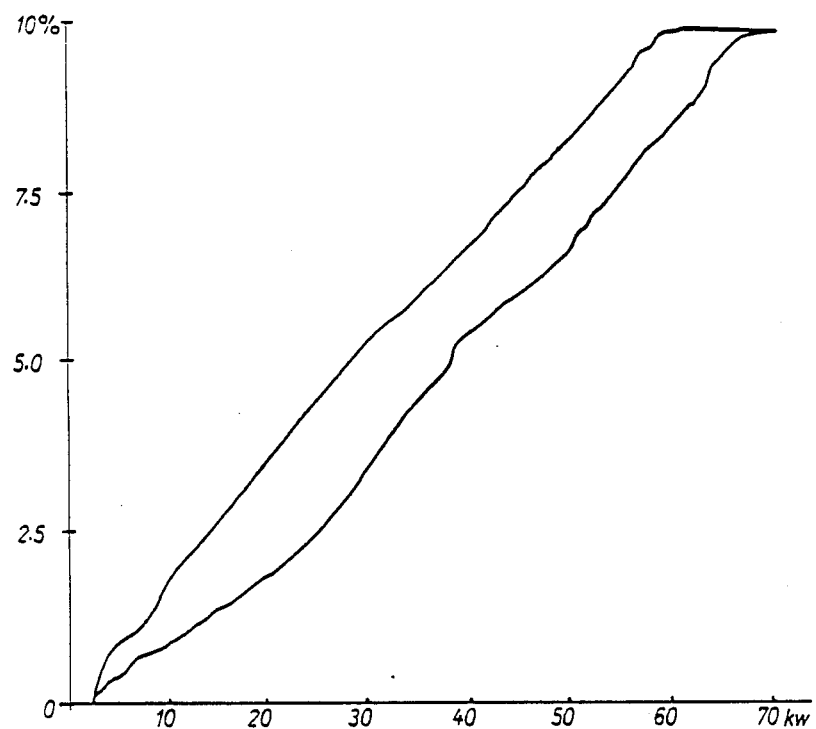
FIG. 13 shows a graph of belt slip against horsepower for the threshing cylinder belt drive shown in FIGS. 2 and 3.

A graph of slip of belt 34 with the transmitted power, is illustrated in FIG. 13, in which belt slip S is represented by the difference in speed between pulleys 30 and 32 taken as a percentage of the speed of the drive pulley 30, and in which the transmitted power is represented by the applied horsepower HP. It will be noted from this graph that belt slip S is substantially proportional to horsepower HP up to a level of about 10 percent slip, and beyond this level the relationship changes as the drive capability of the belt is exceeded.

Slip of belt 34 is measured using a a magnetic shaft speed sensor 50 associated with the rear beater shaft 31 and a similar magnetic shaft speed sensor 51 associated with the cylinder shaft 36 so that each generates an electrical pulse signal at a rate corresponding to the rate of rotation of the associated shaft. It will be appreciated that the sensor 51 is effectively measuring the rate of rotation of the output shaft 33 because of the non-slip nature of the chain-drive gearbox 35 connecting the output shaft 33 to the cylinder shaft 36. Each sensor comprises a disc 52 secured coaxially to the shaft and having a series of equi-angularly spaced notches 53 around its periphery, and a magnetic pick-up 54 mounted adjacent the periphery of the disc 52 so that the passage of each notch 53 past the pick-up produces a magnetic flux variation therein that generates an electrical pulse. The pulse signal from each sensor is filtered and shaped in a corresponding pulse conditioning unit 55 so as to produce a constant amplitude square pulse signal that can be processed digitally in the processor unit 13 to calculate the average rate of rotation of each shaft over successive predetermined time periods. The average rate of rotation values so calculated are then processed in the processor unit 13 and used in the automatic mode of control of the combine to produce an output control signal, as described hereinafter, to operate the electromagnetic actuator 14 controlling the combine hydrostatic drive system 3, thereby to control the forward speed of the combine.

Figure 4:
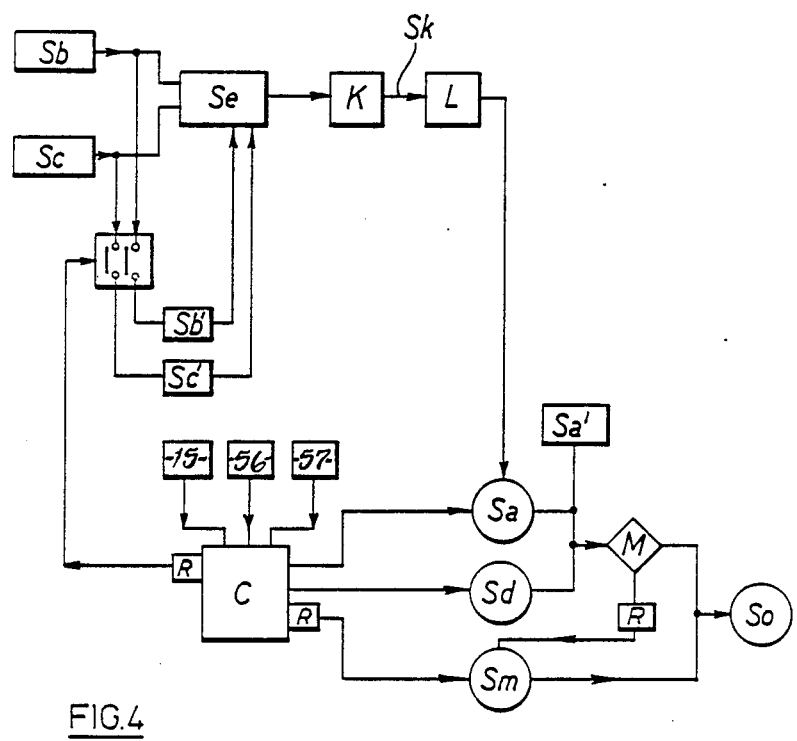
FIG. 4 shows a schematic diagram of the processor unit forming part of the control system.

The processor unit 13 and its manner of operation can be best described with reference to the flow control diagram shown in FIG. 4. Sb and Sc represent the digital averaging process that is performed on each of the pulse signals from the shaft speed sensors 50 and 51. Typically, these pulses are counted over successive predetermined time intervals and a predetermined number of the resulting counts averaged, the averaging process being repeated at the end of each new counting interval so that the average count is continuously updated. The resulting average counts Sb and Sc corresponding to the rate of rotation of the rear beater shaft 31 and the cylinder shaft 36, respectively, are then processed, as represented by Se in FIG. 4, to produce an error signal. This processing involves a subtraction step to produce a difference count Sc−Sb, and then a division step to produce a ratio $$\frac{Sc - Sb}{Sc},$$

which is the belt slip ratio. This ratio is then compared with a reference belt slip ratio which is derived by the same process, but which employs stored values of Sc and Sb, represented as Sc' and Sb' in FIG. 4.

When the combine is operating in the manual mode of operation, as determined by the setting of the mode selection switch 15 in the cab 11, the stored values Sc' and Sb' are the same as the current updated count values Sc and Sb, and thus the reference belt slip ratio $$\frac{Sc' - Sb'}{Sc'}$$

is also the same as the current belt slip ratio $$\frac{Sc - Sb}{Sc}.$$

Comparison of these two ratios which involves a subtraction process, therefore results in a zero error signal Se. This error signal is processed by being subject to a gain function K and a conversion function L, described hereinafter, to produce an automatic control signal Sa, but this is blocked by check control logic C because the mode selection switch 15 is set in the manual mode. Instead, the check control logic C selects the manual control signal Sm from the control lever 10 as the final control output So, which operates the actuator 14 to control the forward speed of the combine.

Selection of the manual control signal Sm as the control output So, serves to trigger a reset operation R which sets the gain factor of the gain function K so that the automatic control signal Sa is made equal to the manual control signal Sm. In this way, the automatic control system is preset so that it is ready to assume automatic control of the forward speed of the combine at the same speed as that selected by the manual control lever 10 whenever the operator switches the selector switch 15 from the manual control mode to the automatic control mode. The operator therefore controls the forward speed of the combine manually until he is satisfied that the crop treatment means is giving optimum performance, and then switches the selector switch 15 over to the automatic control mode.

The reset operation R employs the conversion function L to select the input Sk required from the gain function K to produce the control output Sa equal to So. The conversion function L is illustrated graphically in FIG. 5, and takes the form of a linear function of Sa against Sk. For any value of So', the corresponding value of Sk' is determined digitally, and this value of Sk' is then used to select a corresponding predetermined value of the gain function K. The gain function K itself comprises proportional, integral and derivative gain functions, and the reset operation R involves setting the derivative gain to zero and setting the integral gain to produce the required value of Sk'.

Switching the selector switch 15 to the automatic control mode also serves to trigger the reset operation R to ensure that the automatic control signal Sa is equal to the manual control signal Sm at this time. Switching to the automatic control mode also serves to record the counts Sb and Sc corresponding to the rate of rotation of the rear beater shaft 31 and the cylinder shaft 36 at this time. These recorded counts are represented as Sb' and Sc' in FIG. 4, and are processed to produce the reference belt slip ratio $$\frac{Sc' - Sb'}{Sc'},$$

which is compared with the actual belt slip ratio $$\frac{Sc - Sb}{Sc}.$$

Thus if the belt slip ratio changes due to a change in the crop load at the threshing cylinder 20, the error signal Se comprising $$\frac{Sc - Sb}{Sc} - \frac{Sc' - Sb'}{Sc'}$$

and the corresponding automatic control signal Sa will vary accordingly. The check control logic C now selects the automatic control signal Sa instead of the manual control signal Sm to operate actuator 14 and control the forward speed of the combine. Thus the forward speed of the combine will be varied according to the crop load at the threshing cylinder in order to maintain this load substantially constant at that level determined by the operator under manual control prior to switching to the automatic control mode.

Whilst in the automatic control mode, the forward speed of the combine is limited to a maximum speed determined by the setting of the manual speed control lever IO. The processor 13 achieves this by comparing both control signals Sa and Sm, represented by M in FIG. 4, and switching from Sa to Sm as the control output So, if Sa exceeds Sm. Switching over to Sm also serves to trigger the reset function R so that the automatic control signal Sa is maintained at the maximum speed setting Sm even if the error signal Se still changes.

Figure 5:
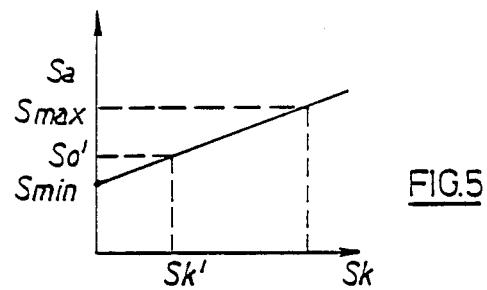
FIG. 5 shows a graph of a conversion function L used in the processor unit.

Also, the overall range of forward speeds of the combine in the automatic control mode is limited by maximum and minimum values S MAX and S MIN of the automatic control signal Sa which are predetermined within the conversion function L, as shown in FIG. 5.

Figure 6:
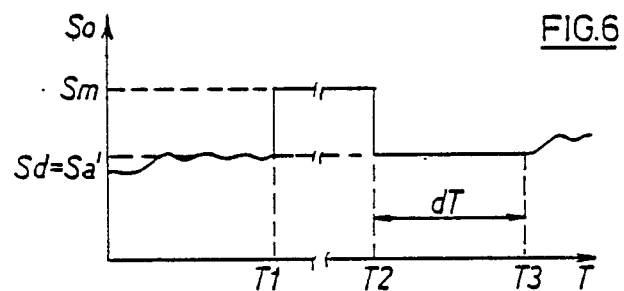
FIG. 6 shows a cycle of operation of the combine speed control output So when the table is raised.

The check control logic C is responsive to the input from the mode selection switch 15, as already described, and is also responsive to an input from a sensor 56 that senses raising of the table and elevator 16,17. The purpose of this sensor 56 is to switch control from automatic to manual speed control if the table is raised, for example, if the table is raised over an obstruction or raised at the end of a field. The check control logic C also serves to ensure that the forward speed of the combine is automatically reestablished at its previous setting once the table is lowered into work again, and is held at this speed for a predetermined time before automatic speed control is resumed. FIG. 6 illustrates a typical cycle of operation of the control system when the table is raised and lowered, the control output So being shown against time T, the table being raised at time T1, being lowered at time T2 and the speed being held constant for a time dT until time T3.

The check control logic C, is also responsive to the input from a grain loss sensor 57 which serves to monitor grain loss at the rear of the straw walkers 23 and is compared with a predetermined maximum loss level so as to trigger a reduction of the forward speed of the combine if this level is exceeded when in the automatic control mode. The reduced speed is then held constant for a predetermined time so that the previous high crop load/high grain loss condition can clear itself before automatic speed control is resumed. Further, once automatic speed control is resumed, any further reduction of speed in response to excess grain loss is inhibited for a predetermined time so as to avoid a rapid succession of speed reductions that would make automatic speed control impractial. If excess grain loss persists, then this will be indicated on the conventional grain loss meter 58 in the combine cab and the operator has the choice of either accepting the loss or switching the manual forward speed control or taking other corrective action.

Figure 7:
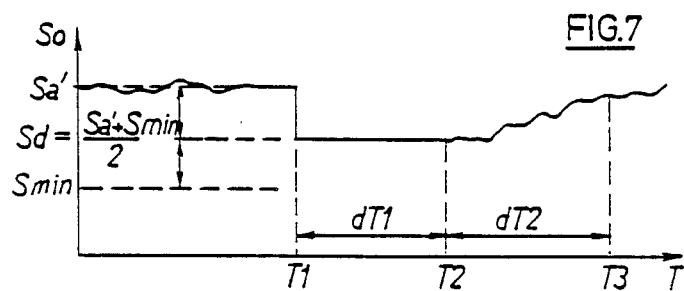
FIG. 7 shows a cycle of operation of the combine speed control input So when excess grain loss is sensed.

FIG. 7 illustrates a typical cycle of operation of the control system when excess grain loss occurs, the control output So being shown against time T. The predetermined maximum grain loss level is exceeded at time T1 and the forward speed of the combine is then halved and held constant at this reduced speed for a predetermined time period dT1 until time T2. Automatic speed control is then resumed, but any signal to reduce the forward speed again in response to excess grain loss, is ignored for a predetermined time period dT2 until time T3. After time T3 the occurence of excess grain loss will again trigger a halving of the combine forward speed. It will be noted from FIG. 7 that the combine speed is halved by selecting the midpoint Sd between the current automatic control signal Sa' and the minimum value of this signal S MIN, where $$Sd = \frac{Sa' + S\,MIN}{2}.$$

In an alternative embodiment, the grain loss sensor 57 be relocated in the grain cleaning means 24 to monitor grain loss from the grain cleaning means, or two similar sensors may be provided to monitor grain losses simultaneously from the straw walker and the grain cleaning means.

Figure 8:
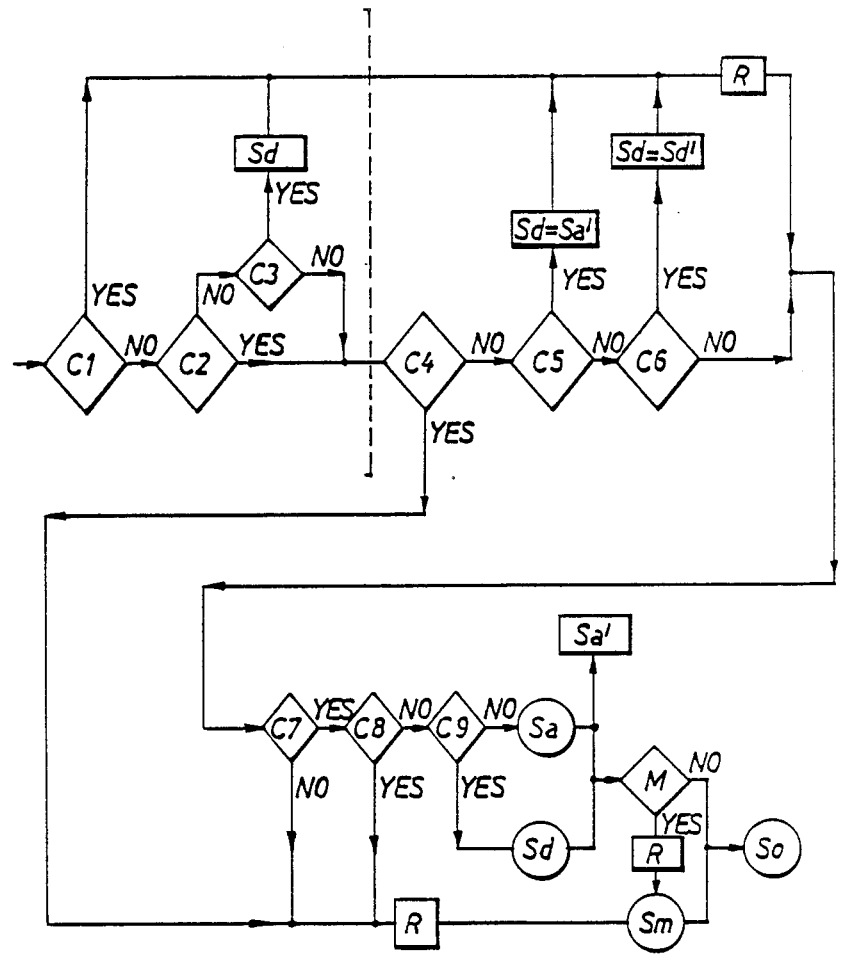
FIG. 8 shows the flow control diagram of the check control logic in the processor unit.

The check control logic C is shown in more detail in FIG. 8 and comprises a sequence of check operations that are carried out repeatedly in step with updating of the average counts Sb and Sc and which involve the control inputs from the mode selection switch 15, the table raise sensor 56, and the grain loss sensor 57. The check operations are shown as C1 to C9 in FIG. 8 and comprise the following checks:

C1—"Is the forward speed being held constant?"
C2—"Does a speed reduction inhibit exist?"
C3—"Does an excess grain loss condition exist?"
C4—"Is the table up OR is the manual control mode selected?"
C5—"Is the table going up?"
C6—"Is the forward speed being held constant?"
C7—"Is the rear beater engaged?"
C8—"Is the table up OR is the manual control mode selected?"
C9—"Is the forward speed being held constant?"
M—"Is Sa or Sd ≧ Sm?

The check sequence commences on the left-hand side and comprises a section to the left of the broken line to check excess grain loss followed by a section to the right of the broken line to check selection of manual or automatic speed control, to check table raise, and to check whether or not the rear beater is being driven.

In the grain loss section, the first check C1 asks, "Is the forward speed being held constant?" i.e., is the time period dT1 running following the occurence of excess grain loss at time T1 (see FIG. 7)? If the decision is NO, the second check C2 asks "Does a speed reduction inhibit exits?" i.e., is the time period dT2 running following time T2 when the constant speed control is removed? If the response is NO, then the third check C3 asks "Does an excess grain loss condition exist?", and if the response is NO, the check proceeds to the manual-/automatic check and the table raise check, beginning with check C4.

Check C4 asks, "Is the table up OP Is the manual control mode selected?". If the response is YES, check C4 triggers the reset operation R and causes the manual control signal Sm to be passed as the output control So. If, however, the response is NO, check C4 is followed by the check C5 that asks "Is the table going up?", as at time T1 in FIG. 6. If the answer is NO, then the check C6 asks "Is the forward speed being held constant?, i.e., is the time period dT running following lowering of the table at time T2. The three checks C4, C5 and C6 together determine whether or not a table raise cycle is in progress, and if it is not, the check proceeds from C6 to three final checks C7, C8 and C9.

Check C7 asks, "Is the rear beater engaged?", check C8 asks "Is the table up OR Is the manual control mode selected?", and check C9 asks "Is the forward speed being held constant?" either during a grain loss cycle of operation or a table raise cycle of operation. If the beater is engaged (as indicated by the count Sb), if the table is down or the automatic control mode selected, and if the forward speed is not being held constant, then the automatic control signal Sa is passed as the output control So, provided also Sa does not exceed Sm as judged in check M.

Considering now a situation in which the grain loss exceeds the predetermined maximum loss level at time T1 in FIG. 7 whilst the system is in the automatic speed control mode, check C3 will change its response to YES and trigger the storing of a saved signal Sd which is equal to the average of the current value Sa' of the automatic control signal and the minimum value of this signal S MIN $$\left(\text{i.e. } Sd = \frac{Sa' + S\,MIN}{2}\right).$$

Check C3 will also trigger the reset operation R then continue with the final sequence of checks C7, C8 and C9, causing the signal Sa to be passed as the output control So.

The next successive check sequence will then cause checks C1 and C9 to change their response to YES, because the forward speed of the combine is now being held constant during period dT1. Check C1 will now trigger the reset operation R and check C9 will cause the saved signal $$Sd = \frac{Sa' + S\,MIN}{2}$$

to be used as the output control So. The forward speed of the combine is therefore reduced by half of the sum of the actual speed and the preset minimum speed.

Once the speed hold dT1 terminates at time T2, checks C1 and C9 change their responses back to NO, but at the same time check C2 changes its response to YES because the speed reduction inhibit period dT2 commences. The checks proceed through C4, C5, C6, C7, C8 and finally C9 to cause the control signal Sa to be passed as the control output So. At this time Sa is equal to $$Sd = \frac{Sa' + S\,MIN}{2}$$

because of the reset operation R. Automatic control of the forward speed of the combine therefore resumes. However, if the maximum grin loss level is exceeded during the speed reduction inhibit period dT2, the control system will not respond to reduce the forward speed because the YES response of check C2 by-passes the excess grain loss check C3 and proceeds directly to check C4. It is only after period dT2 has expired at time T3 that check C3 becomes effective again.

Considering now raising of the table when the system is in the automatic control mode and there is no excess grain loss cycle in progress, the response of check C5 at time T1 in FIG. 6 when the table is going up, will change to YES and cause the current automatic control signal Sa' to be stored as a signal Sd' and will trigger the reset operation R. The check sequence then proceeds through C7, C8 and C9, and the automatic control signal Sa is passed as the output control So. As soon as the table is up, the checks C4 and C8 change their response to YES so that check C4 triggers the reset operation R and causes the manual signal Sm to be passed as the output control So. If at this time an excess grain loss condition existed, the check sequence from check C3 would by-pass check C4, but would include check C8 that would have the same affect as check C4 in triggering the reset operation R and causing signal Sm to be used as the output control So.

If now the table is lowered at time T2 in FIG. 6, the checks C4 and C8 change to give NO responses again and the speed hold checks C6 and C9 change their response to YES. Check C6 therefore causes the stored signal Sd' to be used as the saved output Sd. Check C6 also triggers the reset operation R and is followed by checks C7, C8 and C9, the last of which causes the saved output Sd=Sd'=Sa' to be used as the control output So Thus, the forward speed of the combine is returned to the same speed as that when the table was raised. This situation will continue while the speed hold period dT continues, but when this terminates at time T3, the checks C6 and C9 change to give NO responses again and thus the check sequence proceeds as normal through C1 to C9 with the automatic signal Sa being passed as the control output So.

Figure 2:
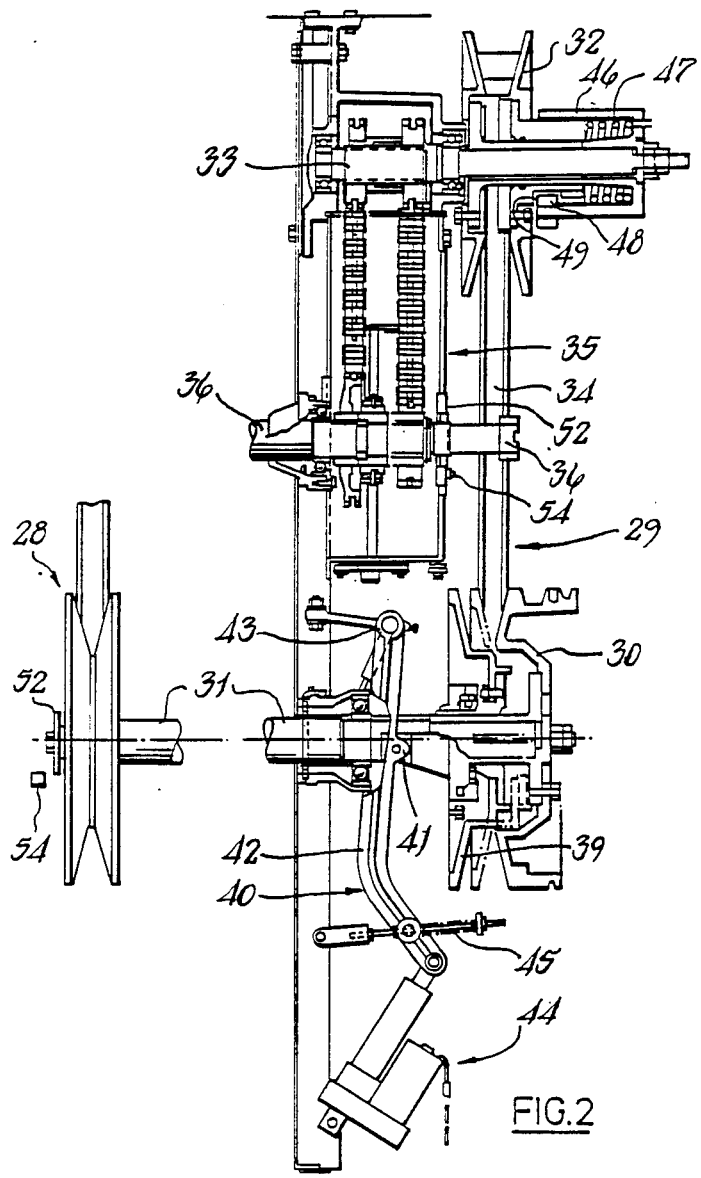
FIG. 2 shows part of the drive system for the threshing cylinder of the combine in FIG. 1.
Figure 3:
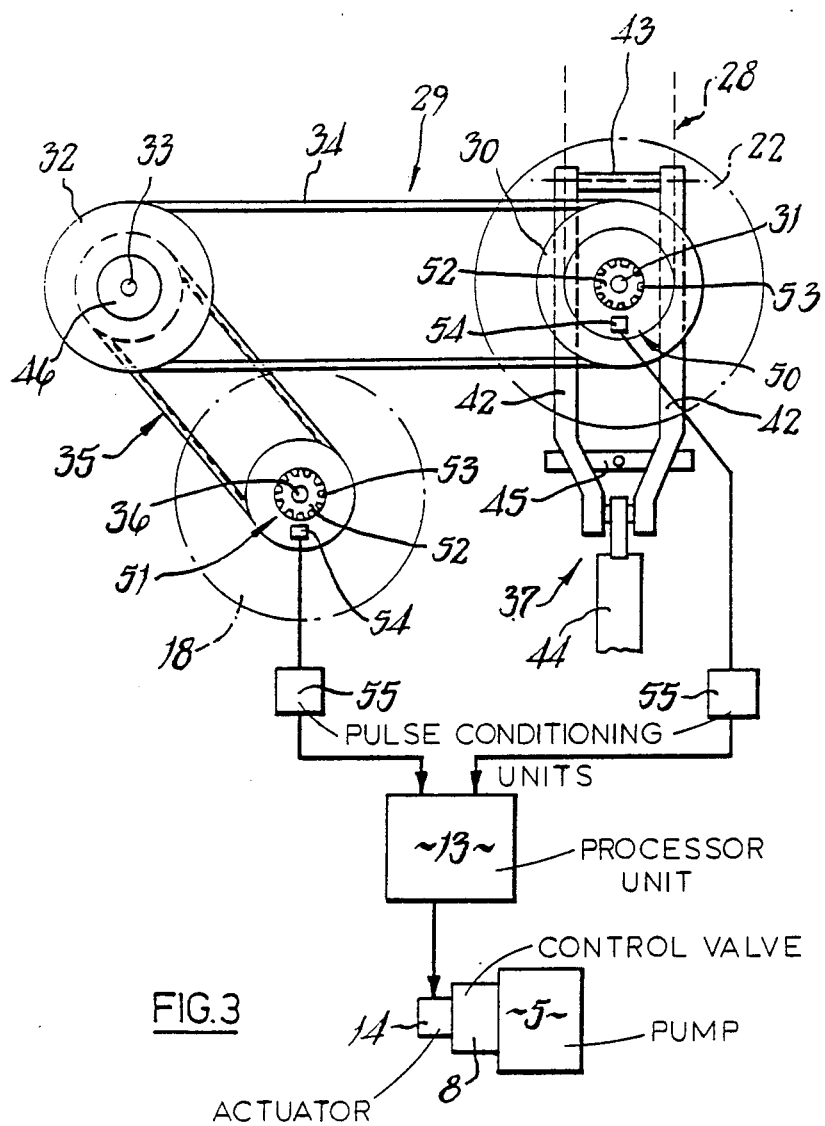
FIG. 3 shows a schematic drawing of the drive system of FIG. 2 with belt slip ratio measuring means.
Figure 9:
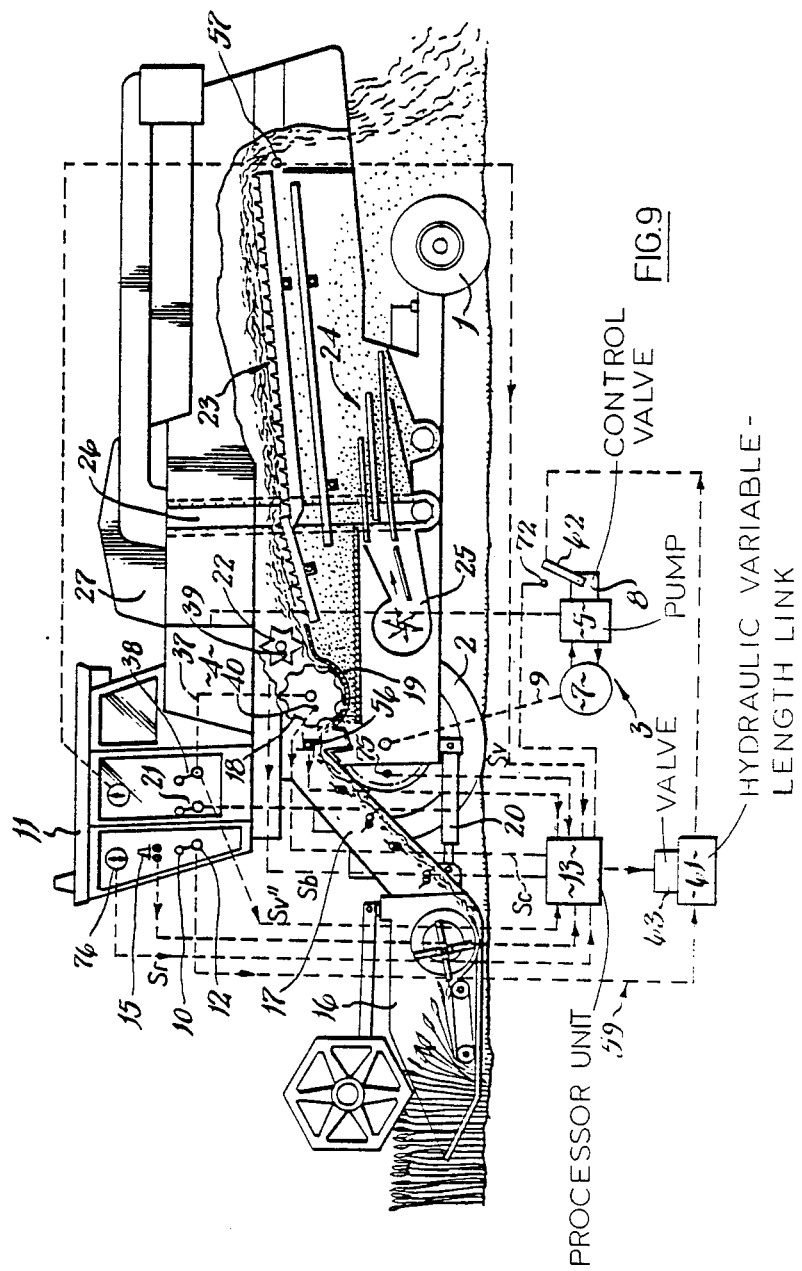
FIG. 9 shows a schematic diagram of a combine harvester similar to that of FIG. 1, fitted with an alternative automatic forward speed control system according to the invention.
Figure 10:
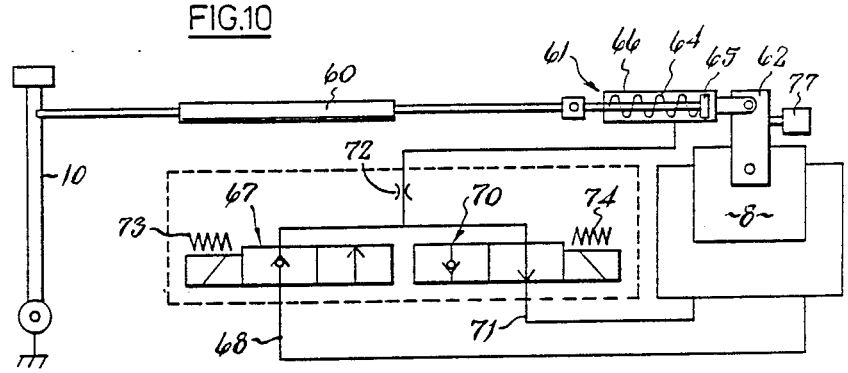
FIG. 10 shows a more detailed schematic diagram of part of the forward speed control system of FIG. 9.
Figure 11:
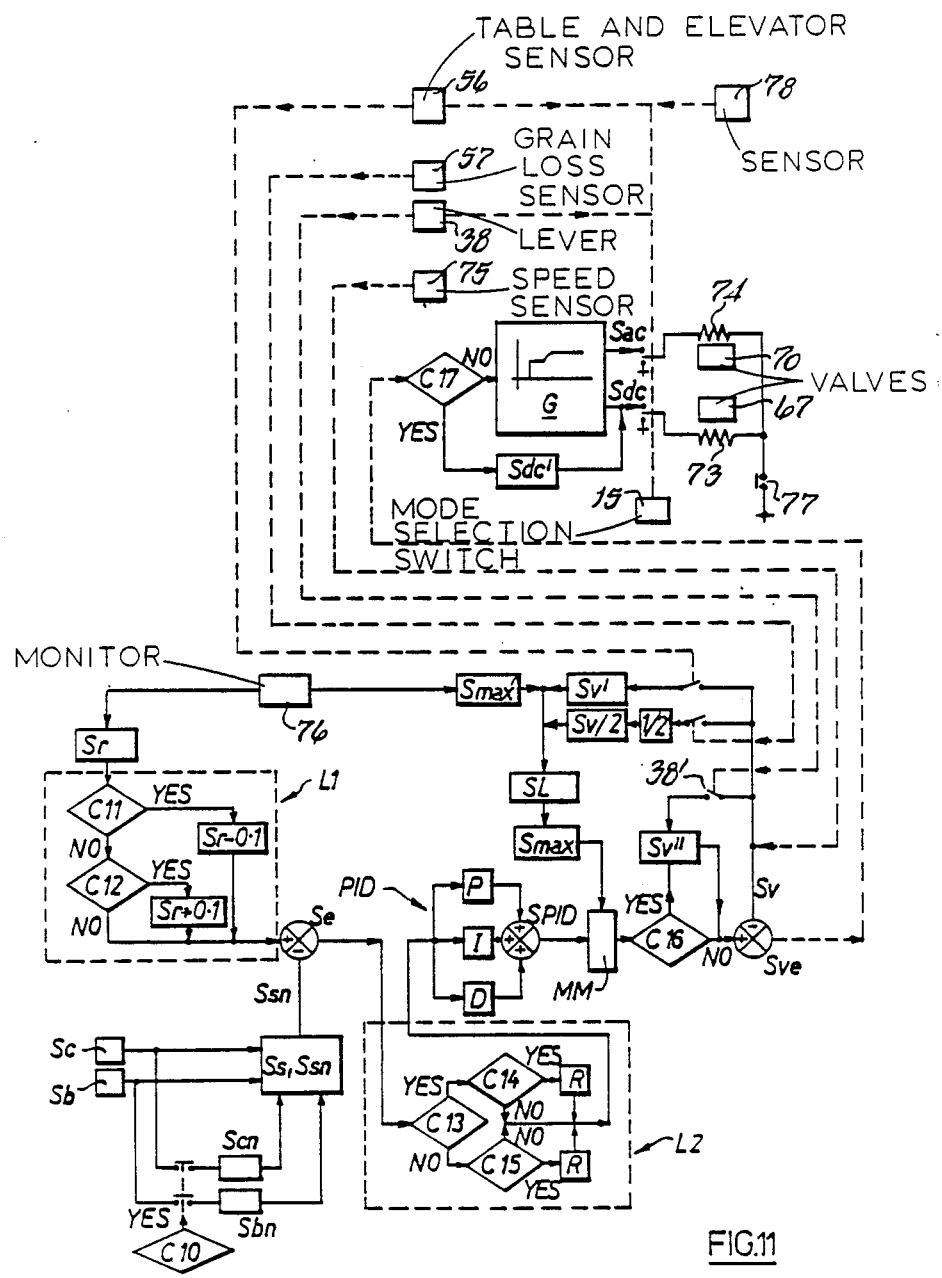
FIG. 11 shows a schematic diagram of the processor unit forming part of the control system of FIG. 9.

FIGS. 9 to 11 illustrate an alternative embodiment of the invention as applied to a combine similar to that illustrated in FIGS. 1 to 3. The combine has the same hydrostatic drive system 3, but the displacement control valve 8 that controls the flow of fluid to the motor 7 so as to vary forward speed, is controlled by a direct mechanical connection 59 from the manual speed control lever 10 in the cab 11. This connection 59 comprises a control cable 60 that is connected at one end to the lever 10, and at its other end via a hydraulic variable-length link 61 to an operating arm 62 of the control valve 8. The forward speed of the combine is therefore controlled by the position of lever 10 in the cab, and the length of the link 61. It is the latter means of control that is used for automatic controls of the forward speed of the combine when harvesting so as to maintain a substantially constant flow of crop through the crop processing means. Hydraulic valve means 63 control the supply of hydraulic fluid to and from the link 61 to vary its length, and is operated under the control of a processor unit 13 which, similar to that of FIGS. 1 to 3, uses the slip of belt 34 on pulleys 30 and 32 as the primary control parameter.

The hydraulic variable-length link 61 comprises a single-acting ram with a return spring 64 acting on the piston 65 within the cylinder 66. The valve means 63 comprises a pair of solenoid operated valves, one being a normally closed valve 67 connected in a pressure supply line 68 to the input 69 of ram 61, and the other being a normally open valve 70 connected in a pressure return line 71 from the input port 69 of ram 61 to the hydraulic reservoir. Thus valve 67 serves as a pressure supply valve, and valve 70 serves as a pressure drain valve. A flow restrictor 72 is provided in the connection between the input port 69 and both valves 67, 70.

When the combine is in the manual control mode, the solenoids 73,74 of both valves 67, 70 are de-energised and thus the ram 61 is cut-off from the pressure supply line 68 by the supply valve 67 and is connected to the pressure return line 71 by the drain valve 70. Thus pressure is drained from the ram 61, and the return spring 64 acts to retract the piston so that the link 61 assumes its shortest length.

When the combine is in the automatic control mode, the processor unit 13 controls energisation of the solenoids of the two valves 67, 70 so as to supply fluid to the ram to lengthen it thereby operating the displacement control valve 8 to reduce the forward speed of the combine; or to drain fluid from the ram to shorten it, thereby operating the displacement control valve 8 to increase the forward speed of the combine. Thus, solenoid 74 is held energised and solenoid 79 is pulsed to reduce combine speed progressively, and solenoid 74 is pulsed with solenoid 73 de-energised to increase combine speed progressively. Under constant speed conditions, solenoid 73 is de-energised while solenoid 74 is held energised.

It will be appreciated that it is well known for combines to have forward speed control systems with a direct mechanical connection, such as connection 59, between a manually operable speed control lever in the cab and a speed variator, and that it is a simple matter to adapt such systems by providing a variable-length link, such as ram 61 in series with said connection 59 to accomodate automatic forward speed control. The reliability of known mechanical control mechanisms is therefore retained.

The processor unit 13 and its manner of operation is best described with reference to FIG. 11. As in the first described embodiment, Sb and Sc represent the digital averaging process that is performed an each of the pulse signals from the shaft speed sensors 50 and 51, shown in FIG. 3, to produce signals Sb, Sc corresponding to the rotational speeds of the rear beater shaft 31 and cylinder shaft 36 respectively These signals Sb and Sc are then processed to produce a belt slip ratio signal which is normalised so that it can be compared with a preselected belt slip reference signal Sr corresponding to a require level of loading of the threshing cylinder 18, thereby producing an error signal Se for automatic forward speed control. The actual belt slip ratio signal $$Ss = \frac{Sb - Sc}{Sb}$$

and the normalised belt slip ratio signal $$Ssn = \left(1 - \frac{Sb \times Sc}{Sbn \times Scn}\right),$$

where Sbn and Scn are the values of the signals Sb and Sc with the combine operating under no-load conditions. These no-load measurements Sbn and Scn are made with the combine stationary and with the crop processing means operating. A sensor 75 measures the forward speed Sv of the combine and allows the stationary condition Sv=0 to be detected The speed Sb of the rear beater is used to detect the no-load condition when Sb is steady at a predetermined speed Sb. A check C10—"Is Sv=0 and Sb=Sb'?" detects these conditions and causes Scn and Sbn to be recorded The combine operator selects the belt slip reference signal Sr using a monitor 76 in the cab Typically, the selection is made on a scale of 0 to 100 in steps of 1 corresponding to the range of loading of the threshing cylinder before over-load conditions occur. Thus, the operator is basically selecting the set-point for the loading of the threshing cylinder, when the combine is under automatic forward speed control.

Before comparison with the belt slip ratio signal Ssn, the belt slip reference signal Sr is subject to logic processing L1 according to whether or not the engine 4 is overloaded. A drop in the speed of the rear beater shaft 36 below a predetermined normal operating speed Sbr detected by Check C11—"Is Sb<Sbr?" is used to indicate an engine overload condition and serves to reduce the load set-point Sr by a predetermined amount, typically in steps of 0.1 on the scale of monitor 76 at a repetition rate of 0.25 seconds. The reduced load set-point will cause the combine forward speed Sv to be reduced, as described hereinafter, thereby reducing the crop loading of the combine and the consequent loading of the engine 4. The rear beater speed Sb therefore increases to the normal operating speed Sbr, and once reached, this is detected by check C11 and causes Check C12— "Is Sr<operator selected Sr?", to increase the load setpoint Sr back to that selected by the operator.

The error signal Se produced by comparing Ssn and Sr is subject to logic processing L2 before passing to a proportional/integral/differential processor PID. The logic processing L2 serves to reset the integral value I in the PID processor to a value corresponding to the forward speed Sv of the combine if the difference between the demanded speed represented by the integral value and the actual speed Sv exceeds a predetermined magnitude. A check C13—"Is error positive?" distinguishes between positive and negative errors, and checks C14—"Is I<<Sv?" and C15—"Is I>>Sv?" detect excessive differences. The reset operation R, sets I to a value corresponding to Sv. For example, when switching from the manual control mode of the combine to automatic forward speed control using switch 15, I and Sv may be very different, in which case I is set to correspond to Sv so that the combine more quickly reaches the speed for the selected load set-point Sr.

The output signal S PID from the PID processor is subject to a process step MM that sets maximum and minimum limits S MAX and S MIN for this signal corresponding to maximum and minimum combine forward speeds. The output signal S PID is then subject to a check C16—"Has Threshing Cylinder Speed been adjusted?", before being compared with the forward speed signal Sv to produce a speed error signal Sve.

A maximum value S MAX is preselected by the combine operator for step MM using the monitor 76. However, this maximum value may be over-ridden in either of two situations, one being when the table and elevator 16, is raised, as detected by the sensor 56, and the other being when the grain loss detected by the grain loss sensor 57 exceeds a predetermined value. Raising of the table and elevator causes the current value of forward speed Sv to be recorded as Sv' while the table is raised and for a predetermined time after it is lowered again, and an excess grain loss causes half the value of the current forward speed Sv to be recorded as Sv/2 for a predetermined time after excess grain loss is detected. The maximum value in step MM is then determined by a selecting step SL in which the lowest non-zero value is selected from S MAX', Sv' and Sv/2. Thus, when the table is raised at the end of about, the forward speed of the combine is stored and used to set the forward speed at the same value for said predetermined time after the table is lowered at the beginning of the next bout. Further, when excess grain loss occurs, the combine forward speed is reduced to SV/2 and held constant for said predetermined time.

If the operator uses the lever 38 to change the speed of the harvesting cylinder 18, this is detected by sensor means 38' which causes the current value of the forward speed of the combine to be stored as Sv". This value is then used in place of the S PID output signal in check C16 and is maintained until the manual control mode is selected by the selector switch 15 or until the processor unit 13 is normalised again to produce new values of Sbn and Scn, as described above.

The speed error signal Sve is subject to a check C17—"Is Sv>>Smax?", before being processed in a signal generator section G which produces output signal Sdc and Sac for the solenoids 73, 74 of the hydraulic control valves 67, 70 respectively. These output signals Sdc and Sac are generated in accordance with the sign and magnitude of the speed error signal Sve, and are such as to energise and deenergise the solenoids 73, 74 in the manner already described with reference to FIG. 10, thereby to lengthen or shorten ram 61 or hold its length constant. The relationship between the speed error signal Sve and the output signals Sdc and Sac are as follows:

|  | MANUAL | Sve=0 | Sve +ve | Sve −ve |
|---|---|---|---|---|
| Sdc (Valve 62) | 0 | 0 | 0 | Pulsed +ve |
| Sac (Valve 65) | 0 | +ve | Pulsed +ve | +ve |
| RAM 56 Response | Vented. Ram fully retracted. | Pressure locked in. Length fixed | Shorten ram to accel. | Lengthen ram to decel. |

When the manual control mode is selected by the switch 15, the connections to the solenoids 73, 74 are broken and thus both are de-energised so that ram 61 is fully drained to the reservoir through drain valve 70. Only the manual speed control lever 10 can then operate the displacement control valve 8 to vary the forward speed of the combine.

When the automatic control mode is selected by the switch 15, the connections to the solenoids 73, 74 are made and the signals Sdc and Sac become effective. Thus, if the system is in a steady state condition for a predetermined load setpoint Se with the combine travelling at a steady speed Sv, the speed error signal Sve will be zero and only Sac will be produced to energise drain valve 70 and lock the pressure in ram 61, thereby holding its length fixed. If the loading of the system now decreases, the speed error signal Sve becomes positive and Sac will be produced as a pulsed signal to open drain valve 70 intermittently and progressively drain fluid from the ram 61, thereby shortening ram 61 until the forward speed of the combine increases sufficiently to reduce the error signal Sve to zero. Alternatively, if the loading of the combine increases, the speed error signal Sve becomes negative and Sac will be produced to energise drain valve 70 and close it, and Sdc will be produced as a pulsed signal to open supply valve 67 intermittently to progressively supply fluid to the ram 61, thereby lengthening ram 61 until the forward speed of the combine decreases sufficiently to bring the error signal Sve to zero.

When pulsed, both of the signals Sdc and Sac, are subject to pulse-width modulation so that the larger the magnitude of the error signal Sve the larger the mark:space ratio, and the more rapid the operation of the ram 61. Typically, the mark:space ratio is set at a predetermined minimum level up to a predetermined value of Sve, beyond which the ratio is increased linearly to a predetermined maximum level at which the ratio is held constant with increasing error signal Sve. This characteristic may be different for both Sac and Sdc. Further, both signals may be adapted so that they are held at zero over an initial range of values of Sve so as to enhance the stability of the system.

The check C17—"Is Sv>>S MAX?" serves to set Sdc to a predetermined level Sdc' if Sv exceeds Smax by a predetermined amount. In this way excessive forward speed of the combine is reduced more rapidly to the normal range of automatic speed control SMAX to SMIN.

In operating the operating arm 62 of the displacement control valve 8 to reduce the speed of the combine, it is possible to go beyond the neutral position and engage the reverse drive condition. In order to avoid this when in the automatic control mode, a switch 77 is provided which senses the neutral position of the operating arm 61 and deenergises both solenoids 73, 74 so that the combine is effectively returned to the manual control mode.

When in the automatic control mode, a number of conditions can arise that will automatically reset the system to the manual control mode. One of these is if the table is raised as detected by the sensor 56. As already explained, raising of the table serves to record the current value Sv' of the forward speed Sv so that this can be used to set the forward speed to the same value after turning between bouts. At the same time, while the table is raised, the system is returned to the manual control mode so that the operator has full control of the combine for turning After turning and lowering the table, the system then return automatically to the automatic control mode.

Also, if the cylinder speed has been adjusted as detected by operation of the lever 38, the current speed Sv" of the combine is recorded and used to maintain this speed. At the same time, the operator is instructed to stop and repeat the procedure for normalising the belt slip ratio Ss. Once the operator stops the combine, the condition Sv=0 is sensed and serves to reset the system to the manual control mode.

The combine is also fitted with a sensor 78 that senses whether or not the engine 4 is connected to the crop processing means. If the engine is disengaged from the crop processing means, the sensor 78 triggers resetting of the system to the manual control mode.

As described above, the load set-point Sr is subject to logic processing L1 according to engine overload conditions as detected by the rear beater speed Sb, and is either increased or decreased depending on the value of Sb compared with a reference valve Sbr. It will be appreciated that in another embodiment of the invention, the load set-point Sr can be automatically varied in response to other operating conditions of the system. For example, the grain losses as sensed by the sensor 57 could be processed to detect the occurrence of losses outside a predetermined acceptable range, and used to vary the load set-point Sr accordingly. Typically, grain losses arise in a cyclic manner, and thus the occurence of a predetermined number of successive loss cycles above or below predetermined maximum and minimum loss limits could be used to respectively, decrement or increment the load set-point.

Figure 12:
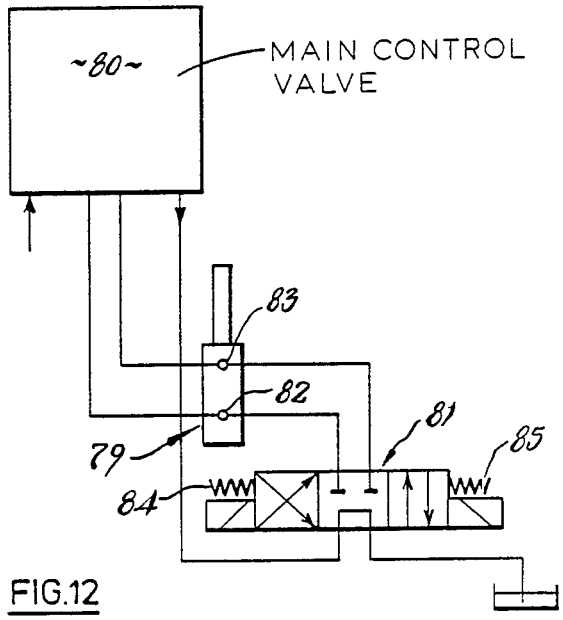
FIG. 12 shows a schematic diagram of yet another alternative embodiment of the invention.

In an alternative embodiment of the invention in which a hydraulic actuator controls a combine speed variator, a hydraulic control valve may be connected to the actuator so that fluid can be either supplied to it or drained from it in accordance with the sign and magnitude of a speed error signal such as Sve in FIG. 11. An example is illustrated in FIG. 12 in which a double-acting ram 79 operates the combine forward speed variator, and in which a main control valve 80, under control of the combine operator, controls the supply of fluid to and from the ram 79 to control combine forward speed. A second control valve 81 is connected across the same ports 82, 83 of the ram 79 and is adapted so that it can be energised by either of two solenoids 84, 85 and accordingly assumes either of two positions in which fluid is supplied to one side or the other of the piston of the ram to extend or retract it. Energisation of these solenoids under the control of the speed error signal Sve could be pulsed in the same manner as in the embodiment of FIG. 12.

In the illustrated embodiments of the invention, the slip in a belt drive to the threshing cylinder is used to monitor the crop load and vary the rate of crop feed accordingly. However, it will be appreciated that the threshing cylinder may be driven by a hydrostatic drive and that this will experience transmission losses proportional to the power transmitted and which are strictly comparable to the belt slip suffered by a belt drive. Thus, these transmission losses can be used in the same manner as belt slip to control crop feed rate, and can be similarly measured in terms of the speed of input and output shafts of the hydrostatic transmission.

We claim:

1. Crop processing apparatus comprising crop processing means; drive means comprising an input drive shaft, an output driven shaft connected to drive the crop processing means, and transmission means through which power is transmitted from the input drive shaft to the output driven shaft and in which relative rotation between the input drive shaft and output driven shaft under constant load conditions causes a transmission loss; a first sensor for producing an output signal corresponding to the rate of rotation of the output driven shaft; setting means for selecting a reference signal corresponding to a selected level of transmission loss in the transmission means; signal processing means which processes the output signal from the first sensor to produce a transmission loss signal corresponding to said transmission loss in the transmission means and which compares said transmission loss signal with said reference signal to produce a crop load control signal; and actuator means that is controlled in accordance with said crop load control signal and is effective to vary the rate of feed of crop to the crop processing means to maintain a substantially uniform load of crop in the crop processing means.

2. Crop processing means as claimed in claim 1 in which the transmission means comprises a drive belt.

3. Crop processing means as claimed in claim 1 comprising a second sensor for producing an output signal corresponding to the rate of rotation of the input drive shaft, and in which the signal processing means processes the output signals from both the first and second sensors to produce respective rate of rotation signals, calculates the ratio of said rate of rotation signals to produce a transmission loss signal, and compares said transmission loss signal with the reference crop load signal to produce said crop load control signal.

4. Crop processing apparatus as claimed in claim 3 in which the signal processing means records values of said rate of rotation signals when the crop processing means is operating under no-load conditions, and which uses the recorded no-load values of said rate of rotation signals to calculate a normalized value of the transmission loss signal.

5. Crop processing apparatus as claimed in claim 4 which includes no-load sensor means that cooperate with the signal processing means to detect when said no-load conditions exist, and serves to trigger the recording of said no-load values of the rate of rotation signals.

6. Crop processing apparatus as claimed in claim 4 in which said setting means is manually-operable, thereby to allow selection of any desired reference signal.

7. Crop processing apparatus as claimed in claim 3 in which said setting means is manually-operable and causes the current values of said rate of rotation signal to be recorded by the signal processing means when the crop processing means is operating at the desired level of crop load, said current values being used to calculate the corresponding transmission loss signal for use as the reference signal.

8. Crop processing apparatus as claimed in claim 1 in which a manually-operable control is provided to allow an operator to select a crop feed rate signal that is supplied as an input to the signal processing means, and in which a manually operable mode selection control is provided to allow an operator to select a mode selection signal that is supplied as an input to the signal processing means, the mode selection signal either being an automatic mode selection signal that causes the actuator means to be controlled in accordance with said corp load control signal for automatic control, or being a manual mode selection signal that causes the actuator means to be controlled in accordance with said crop feed rate signal for manual control.

9. Crop processing apparatus as claimed in claim 8 in which said control signal is subject to a gain control process to produce an error signal, and in which said gain control process is controlled in a manner dependent on said mode selection signal so that selection of the manual control mode serves to set the gain control process to make said error signal equal to the current crop feed rate signal.

10. Crop processing apparatus as claimed in claim 8 in which said crop load control signal is subject to a gain control process to produce an error signal, and in which said gain control process is controlled in a manner dependent on said mode selection signal so that a change from the manual control mode to the automatic control mode serves to set said error signal equal to the current crop feed rate signal.

11. Crop processing apparatus as claimed in claim 8 in the form of a mobile combine harvester in which said actuator means controls the forward speed of the combine harvester, thereby to vary the rate of feed of crop to the crop processing means.

12. Crop processing apparatus as claimed in claim 11 which includes bout sensor means that senses when the combine harvester reaches the end of a bout and begins a new bout, and serves to trigger recording of a signal at the end of a bout and uses this recording to produce the same control signal to control the actuator means at the beginning of the new bout so that the forward speed of the combine harvester is the same at the beginning of a bout as at the end of the last bout.

13. Crop processing apparatus as claimed in claim 1 in the form of a mobile combine harvester in which said actuator means controls the forward speed of the combine harvester, thereby to vary the rate of feed of crop to the crop processing means.

14. Crop processing apparatus as claimed in claim 13 which includes speed sensor means that senses the forward speed of the combine and produces a corresponding forward speed signal, and in which said crop load control signal is subject to a gain control process to produce an error signal which is compared with said forward speed signal to produce a speed error signal.

15. Crop processing apparatus as claimed in claim 14 in which said gain control process is controlled in accordance with a comparison of the forward speed signal and the error signal so that if they differ by more than a predetermined amount the error signal is set equal to the forward speed signal.

16. Crop processing apparatus as claimed in claim 14 in which said maximum limit is manually preselectable by an operator.

17. Crop processing apparatus as claimed in claim 1 which includes loss sensor means that senses grain lost from crop as it is treated in the crop processing means and which produces a grain loss signal, and in which the signal processing means is responsive to said grain loss signal so that above a predetermined level of grain loss, a grain loss over-ride control signal is produced that over-rides said crop load control signal and operates the actuator means to reduce the rate of feed of crop to the crop processing means.

18. Crop processing apparatus as claimed in claim 17 in which said grain loss over-ride control signal is maintained for a predetermined time, and in which a grain loss over-ride control signal is produced to further reduce the rate of feed of crop to the crop processing means if the grain loss still exceeds said predetermined level at the end of said predetermined time.

19. Crop processing apparatus as claimed in claim 1 in which said crop load control signal is subject to a process that sets maximum and minimum limits corresponding to maximum and minimum desired levels of crop load.

20. Crop processing apparatus as claimed in claim 1 in which the crop processing means includes a crop threshing cylinder and a manually-operable speed control mechanism that allows an operator to vary the speed of the threshing cylinder, and in which a sensor is provided to sense operation of the speed control mechanism and cause the signal processing means to record a signal which is used to hold the actuator in the same operable state.

21. Crop processing apparatus as claimed in claim 1 which includes drive means that drives the crop processing means, and sensor means that senses when the crop processing means is being operated by the drive means and produces a corresponding disengage signal when the crop processing mean is disengaged from the drive means; the signal processing means being responsive to said disengage signal so as to disable the actuator means when the disengage signal is produced.

22. Crop processing apparatus as claimed in claim 1 which includes drive means that drives the crop processing means, and overload sensor means that senses when the drive means is overloaded and produces a corresponding overload signal, the signal processing means being responsive to the overload signal so as to cause the setting means to reset the reference signal to a value corresponding to a lower selected level of transmission loss.

23. A self-propelled combine harvester comprising crop processing apparatus as claimed in claim 1, forward speed control means comprising a mechanical connection between a manually-operable control and a forward speed controller, and in which the actuator means comprises a variable-length link provided in series with said mechanical connection and controlled in accordance with said crop load control signal so that the control signal can change the length of the link to vary the forward speed of the combine harvester.

24. A combine harvester as claimed in claim 23 in which the variable-length link comprises a hydraulic ram and associated solenoid-operated control valve means operated in accordance with said crop load control signal.

25. A combine harvester as claimed in claim 24 in which the ran comprises a single-acting ram, and the control valve means comprises one solenoid-operated valve that controls pressurization of the ram to lengthen it and a second solenoid-operated valve that controls venting of the ram to shorten it, and in which the signal processing means produces signals to energise both valves selectively in accordance with the crop load control signal.

26. A combine harvester as claimed in claim 25 in which said solenoid-operated control valve means is energised by a pulse-width modulated signal with a mark: space ratio determined by said processing means in accordance with the magnitude of said crop load control signal.

27. A self-propelled combine harvester comprising crop processing apparatus as claimed in claim 1, and forward speed control means comprising a hydraulic actuator under the independent control of two valves, one being operated in accordance with a manually-operable forward speed control and the other being operated in accordance with said corp load control signal.

* * * * *